(No Model.)
W. H. H. SISUM.
PIPE COUPLING.
No. 399,351. Patented Mar. 12, 1889.
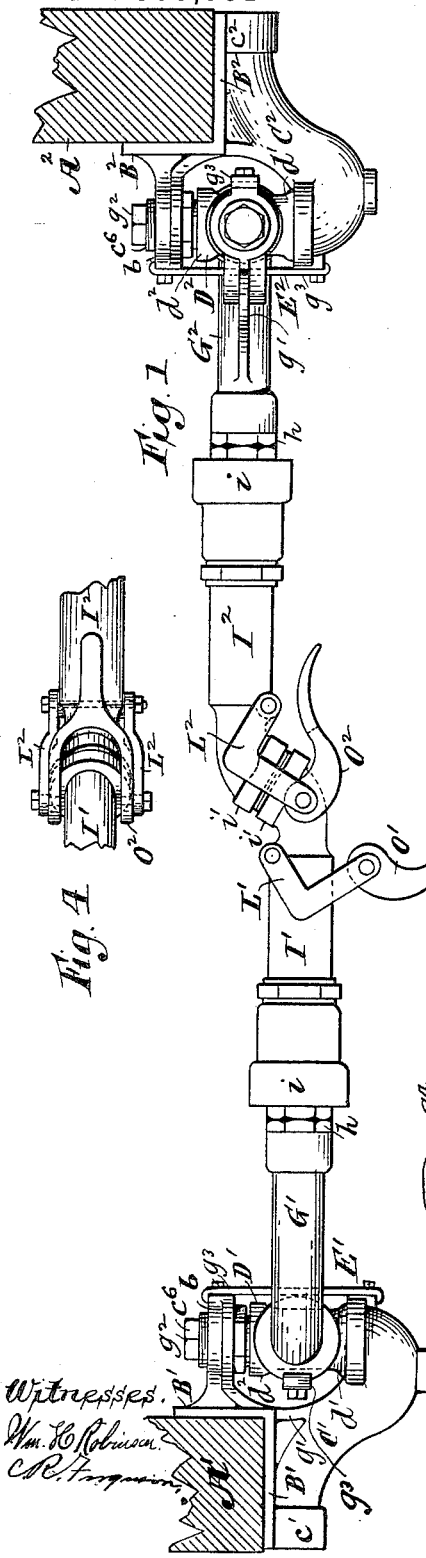
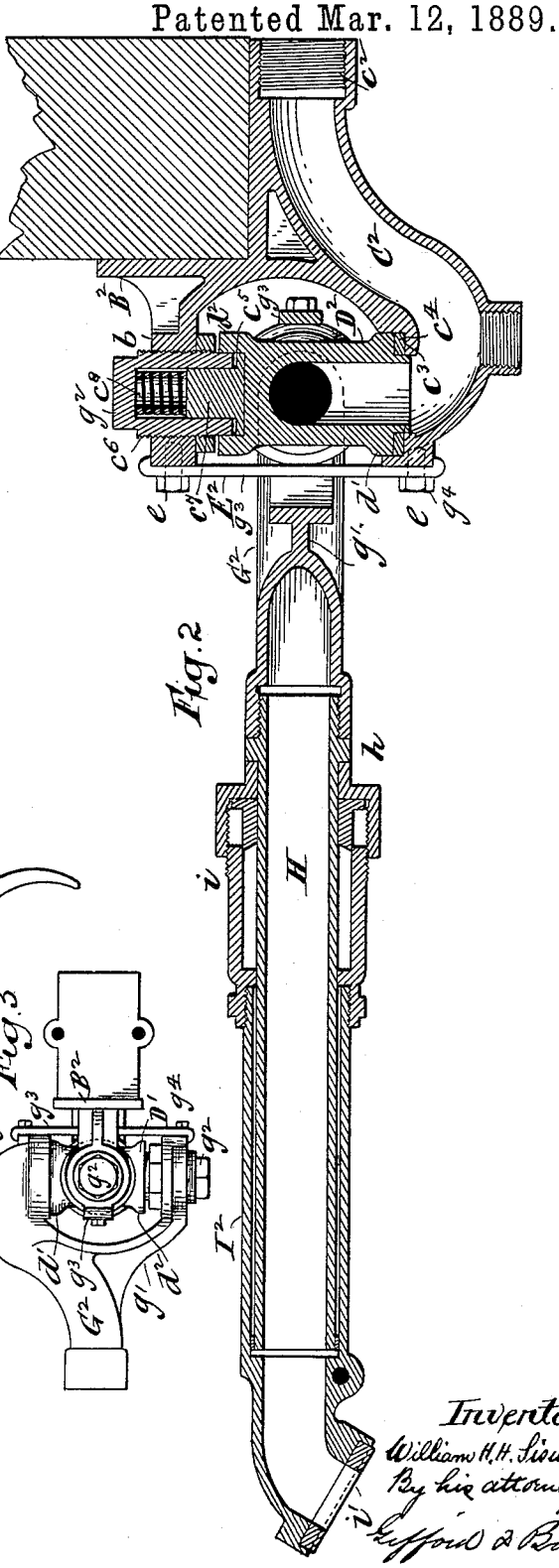
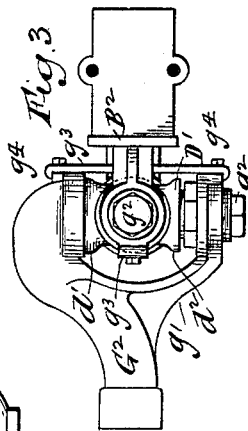
Inventor
William H. H. Sisum
By his attorneys

UNITED STATES PATENT OFFICE.

WILLIAM H. H. SISUM, OF BROOKLYN, NEW YORK.

PIPE-COUPLING.

SPECIFICATION forming part of Letters Patent No. 399,351, dated March 12, 1889.

Application filed November 21, 1888. Serial No. 291,447. (No model.)

*To all whom it may concern:*

Be it known that I, WILLIAM H. H. SISUM, of Brooklyn, in Kings county and State of New York, have invented a certain new and useful Improvement in Pipe-Couplings, of which the following is a specification.

This improvement relates particularly to couplings employed in connection with the pipes which are used upon cars.

I will describe a pipe-coupling embodying my improvement, and then point out the novel features in the claims.

In the accompanying drawings, Figure 1 is a vertical section of the end sills of two adjacent cars and a side view of a pipe-coupling embodying my improvement. Fig. 2 is a similar vertical section of the end sill of one of the cars and an enlarged central longitudinal section of the parts of the coupling which are combined with this car. Fig. 3 is a top view of certain parts. Fig. 4 is an inverted plan or bottom view of certain other parts.

Similar letters of reference designate corresponding parts in all the figures.

$A'$ $A^2$ designate the end sills of two adjacent cars.

$B'$ $B^2$ designate brackets secured by screws or like means to these car-sills. In the present instance the brackets are shown as angular and as being secured to the front and under sides of the sills. There are formed integral with the brackets tubular conduits $C'$ $C^2$, terminating in sockets $c'$ $c^2$, into which pipes running under the car-bodies may be secured. The tubular conduits $C'$ $C^2$ are shown as extending downwardly and then upwardly. At the upper ends they are provided with seats $c^3$. Above the seats are washers $c^4$.

$D'$ $D^2$ designate pipe-sections fitting within the seats $c^3$ of the tubular conduits $C^2$. They have flanges at the ends which fit into these seats, and the flanges extend into the openings within the seats. The washers are between the bottoms of the seats and the opposite surfaces of the pipe-sections $D'$ $D^2$. These pipe-sections where they fit within the seats are cylindrical. So are their flanges. As the seats are circular and the openings within the seats are also circular, it is apparent that the pipe-sections can turn axially. The pipe-sections are tubular only at one end. At the other end they are closed. They have, however, circular cavities $c^5$ in the tops. Into these cavities screws $c^6$ extend. These screws $c^6$ engage with tapped holes in arms $b$, forming part of the brackets $B'$ $B^2$. The screws $c^6$ are shown as hollow. Within their lower ends shanks of bearing-pieces $c^7$ fit. The bottoms of these bearing-pieces are made in the form of circular disks, and they fit within the cavities $c^5$ in the tops of the pipe-sections $D'$ $D^2$. Above the bearing-pieces springs $c^8$ are arranged within the screws $c^6$.

It will be seen that the screws $c^6$ by entering the cavities $c^5$ in the pipe-sections $D'$ $D^2$ support and sustain the pipe-sections in their upright positions, and also that, owing to the combination of the bearing-pieces and springs with the pipe-sections and the screws, the screws have the additional function when rotated of varying the pressure upon the upper ends of the pipe-sections, to insure a tight joint between the pipe-sections and the seats $c^3$ of the tubular conduits $C'$ $C^2$.

I have shown stays consisting of bars $E'$ $E^2$ as extending from the brackets $B'$ $B^2$, near their seats $c^3$, to their arms $b$. I have shown these stay-bars as having hooked ends engaging with the portions of the brackets which they connect, and as secured to the brackets by screws $e$. The pipe-sections $D'$ $D^2$ are approximately T-shaped. They have transversely-extending portions $d'$ $d^2$. The portions $d'$ are tubular and communicate internally with the lower tubular portions of the pipe-sections.

$G'$ $G^2$ designate pipe-sections communicating with the transversely-extending tubular portions $d'$ of the pipe-sections $D'$ $D^2$. The portion $d'$ of each of the pipe-sections $D'$ $D^2$ is provided with a circular end and a circular flange corresponding to the circular end and circular flange of such pipe-section fitting into the corresponding tubular conduit $C'$ or $C^2$.

Each of the pipe-sections $G'$ $G^2$ is provided, opposite the transverse portion $d'$ of the corresponding pipe section $D'$ or $D^2$, with a seat similar to the seats in the tubular conduits $C'$ and $C^2$. The circular end of the transverse portion $d'$ of each of the pipe-sections $D'$ $D^2$ fits into the seat of the corresponding pipe-section $G'$ or $G^2$, and the circular flange at the end of said portion $d'$ passes into an opening within the seat of the said pipe-section $G'$ or G². A washer is interposed between the seat and the opposite surface of the said portion $d'$. Each of the pipe-sections G' G² is provided with a bracket, $g'$. This bracket extends opposite the transverse portion $d^2$ of the corresponding pipe-section D' or D².

A hollow nut, $g^2$, fits in each bracket $g'$ and enters a cavity in the end of the opposite transverse portion $d^2$. A bearing-piece is fitted in the cavity and has a shank extended into the hollow nut $g^2$. A spring between the shank of the bearing-piece and the end of the hollow nut enables the hollow nut by a rotary adjustment to vary the pressure of the bearing-piece upon the transverse portion $d^2$.

The cavity of each transverse portion $d^2$, the corresponding nut $g^2$, the bearing-piece combined with this nut, and the spring interposed between the bearing-piece and the nut are all similar to the cavity $c^5$ in one of the pipe-sections D' or D², the nut $c^6$, the bearing-piece $c^7$, and the spring $c^8$ coacting with such cavity $c^5$.

A rod, $g^3$, is combined with each of the pipe-sections G' G². It extends from the seat of one of these pipe-sections to the outer end of the bracket $g'$ thereof. It is shown as having hooked ends to engage with projections and as being secured by screws $g^4$.

The pipe-sections G' G² at the ends which are removed from the pipe-sections D' D² are provided with sockets. In these sockets pipes H are secured. Pipes I' I² fit upon these pipes H. They are provided with stuffing-boxes $i$, so that they may slide along the pipes H without leakage. The outer ends of the pipes H are flanged, and at the inner ends of the stuffing-boxes there are flanges, which, upon coming into contact with the flanges of the pipes H when the pipes I' I² are slid outwardly thereon, act as stops to prevent the removal of the pipes I' I² from the pipes H. The stuffing-boxes by coming in contact with flanges $h$, with which the exteriors of the pipes H are provided, limit the movement of the pipes I' I² along the pipes H toward the pipe-sections G' G². The outer ends of the pipes I' I² are bent or curved and provided with oblique faces $i'$. The oblique faces of two adjacent pipes, I' I², are adapted to meet and fit together. They may be secured together by any suitable means. In the present instance I have shown for this purpose links L' L², pivoted to the pipes I' I², and cams O' O², pivoted to the links.

The pipes I', I², and H may swing up and down or sidewise, or the car-bodies may sway up and down or sidewise, without affecting them, because they are connected to the car-bodies by universal joints. To make these capabilities more clear, I will add that during any sidewise swinging of the car-bodies or pipes I' I² H the pipe-sections D' D² will oscillate upon their vertical axes relatively to the tubular conduits C' C², or these tubular conduits will oscillate upon the vertical axes of the pipe-sections D' D², and during an up-and-down movement of the pipes I' I² H, or of the car-bodies, an oscillation will occur either of the said pipes upon the transverse axes of the pipe-sections D' D² (the axes passing through the transverse portions $d'$ $d^2$) or of the pipe-sections D' D² relatively to the pipe-sections G' G².

I will now describe more fully the links L' L² and cams O' O².

There are a pair of links, L', and a similar pair of links, L². Both pairs of links are L-shaped. The links L' are pivoted to the pipe I' at the inner bend. The links L² are pivotally connected to the pipe I² at the inner bend. The levers O' O² are bifurcated and pivotally connected to the free ends of the links L' L². The bifurcated ends of these levers are eccentric to the pivots which connect them with the links. The pair of links belonging to one pipe may be swung up over the adjacent end portion of the other, so that the bifurcated ends of the lever attached to such links may bear upon the rear side of a flange on the pipe to which the lever is not connected by its links. By swinging the lever its eccentric bifurcated ends may be made to clamp the two pipes together. Nevertheless, the pipes, owing to their oblique meeting ends, may be pulled apart when necessary.

Owing to the links L' L² being L-shaped, they can be very conveniently swung out of the way when not in use.

What I claim as my invention, and desire to secure by Letters Patent, is—

1. The combination, with tubular conduits and pipes, of approximately T-shaped pipe-sections having portions extending at right angles to each other, two of said portions communicating with the tubular conduits and with the pipes in different planes, and two of said portions being recessed at the ends, and retaining-screws engaging in said recesses, substantially as specified.

2. The combination, with an oscillating pipe-section, of a seat in which it is fitted at one end, a screw entering a cavity at its other end, a bearing-piece fitting the screw and cavity, and a spring between the bearing-piece and the screw, substantially as specified.

3. The combination, with the oblique-ended pipes I' I², of L-shaped links pivotally connected to one of said pipes and a bifurcated lever pivotally connected to said L-shaped links and having eccentric ends, substantially as specified.

WM. H. H. SISUM.

Witnesses:
S. O. EDMONDS,
GEO. WADMAN.